United States Patent
Ye et al.

(10) Patent No.: US 7,620,408 B2
(45) Date of Patent: *Nov. 17, 2009

(54) INTELLIGENT MESSAGING

(75) Inventors: Zhou Ye, Fremont, CA (US); Thomas Wilsher, San Francisco, CA (US); Jibin Xiang, San Jose, CA (US); Xiaolin Zang, Campbell, CA (US); Jimmy Shi, Santa Clara, CA (US); Ali Shah, Solna (SE); Kalpak Dilip Kothari, Chicago, IL (US)

(73) Assignee: Oracle International Corporation, Redwood Shores, CA (US)

( * ) Notice: Subject to any disclaimer, the term of this patent is extended or adjusted under 35 U.S.C. 154(b) by 106 days.

This patent is subject to a terminal disclaimer.

(21) Appl. No.: 11/615,770

(22) Filed: Dec. 22, 2006

(65) Prior Publication Data

US 2007/0130271 A1    Jun. 7, 2007

Related U.S. Application Data

(63) Continuation of application No. 10/684,686, filed on Oct. 13, 2003, now Pat. No. 7,171,190.

(60) Provisional application No. 60/482,383, filed on Jun. 25, 2003.

(51) Int. Cl.
*H04W 4/00* (2009.01)

(52) U.S. Cl. .................. 455/466; 455/412.1; 455/412.2; 455/414.1; 455/414.4; 455/456.1; 709/206; 709/238; 709/246; 370/428; 379/88.14

(58) Field of Classification Search .............. 455/412.1, 455/412.2, 414.1, 414.2, 466, 456.1; 379/88.04, 379/88.14; 709/206, 238, 246; 370/428
See application file for complete search history.

(56) References Cited

U.S. PATENT DOCUMENTS

| | | | | |
|---|---|---|---|---|
| 5,260,988 | A | * | 11/1993 | Schellinger et al. ...... 455/552.1 |
| 5,742,668 | A | | 4/1998 | Pepe et al. |
| 6,049,711 | A | * | 4/2000 | Ben-Yehezkel et al. .. 455/414.3 |
| 6,055,240 | A | * | 4/2000 | Tunnicliffe .................. 370/428 |
| 6,421,707 | B1 | | 7/2002 | Miller et al. |
| 6,564,261 | B1 | | 5/2003 | Gudjonsson et al. |
| 6,594,349 | B2 | * | 7/2003 | Fortman ................... 379/88.14 |
| 6,618,763 | B1 | * | 9/2003 | Steinberg ..................... 709/246 |
| 6,668,043 | B2 | | 12/2003 | Hyziak et al. |
| 6,690,262 | B1 | | 2/2004 | Winnett |
| 6,879,835 | B2 | * | 4/2005 | Greene et al. ............. 455/456.1 |
| 7,133,685 | B2 | * | 11/2006 | Hose et al. ................ 455/456.1 |
| 2001/0003202 | A1 | | 6/2001 | Mache et al. |
| 2001/0027478 | A1 | | 10/2001 | Meier et al. |
| 2003/0118353 | A1 | | 6/2003 | Baller et al. |
| 2003/0212818 | A1 | | 11/2003 | Klein et al. |

\* cited by examiner

*Primary Examiner*—Stephen M D'Agosta
(74) *Attorney, Agent, or Firm*—Townsend and Townsend and Crew LLP (57) ABSTRACT

Techniques for sending messages with automatic device selection and content conversion are provided. A recipient and devices associated with the recipient are determined for a message. A device is selected and the format of the message may be converted based on the selected device, if necessary. The message is then sent to the selected device.

8 Claims, 4 Drawing Sheets

FIG. 4 ic # INTELLIGENT MESSAGING

CROSS-REFERENCES TO RELATED APPLICATIONS

This application is a continuation of U.S. patent application Ser. No. 10/684,686, filed on Oct. 13, 2003, which claims the benefit of U.S. Provisional Application No. 60/482,383, filed on Jun. 25, 2003, each of which is incorporated by reference in its entirety for all purposes.

BACKGROUND OF THE INVENTION

The present invention generally relates to messaging and more particularly to techniques for sending messages with automatic device selection and content conversion.

Advances in technology have created many ways of communicating with a user. For example, users may communicate using email, instant messaging (IM), short message service (SMS), multimedia message service (MMS), facsimile (fax), voice, etc. Users may have any combination of devices that communicate using the above methods. When a sender desires to communicate with a recipient, the sender needs to know what devices the recipient is using and how to communicate with the devices. For example, the sender needs to know the address for the recipient's device, such as a telephone number, email address, etc. Further, the sender needs to use the same device as the recipient's device in order to send a message to the recipient. For example, a SMS device is used to send a SMS message to a SMS device, an IM device is used to send an instant message to an IM device, etc.

Accordingly, the sender needs to determine the appropriate methods of communicating with the recipient and also needs to have access to the same device that will receive the message. This includes many disadvantages. For example, a user may not be able to determine all addresses associated with a user. For example, a sender may only know a recipient's email address. The sender is then restricted in that only emails can be sent to a user. Although the sender may contact the recipient through email, the recipient may have other devices that offer a better means of contacting the recipient or devices that the recipient would prefer to be contacted through. For example, a recipient may prefer to receive instant messages while at work and instant messages may be the fastest way to reach the user. However, the sender would only be able to send an email.

BRIEF SUMMARY OF THE INVENTION

Embodiments of the present invention provide techniques for sending messages with automatic device selection and content conversion. A recipient and devices associated with the recipient are determined for a message. A device is selected and the format of the message may be converted based on the selected device, if necessary. The message is then sent to the selected device.

In one embodiment, a method for sending a message to a recipient is provided. The recipient is associated with a plurality of devices. The method comprises: receiving a message; determining a recipient for the message; determining a plurality of devices associated with the recipient, wherein each device in the plurality of devices are associated with a device identifier and a communication type; determining a device in the plurality of devices in which to send the message based on the communication type associated with the device; and sending the message to the determined device at its device identifier.

In another embodiment, a method for determining a device in a plurality of devices in which to send a message is provided. The method comprises: receiving a message from a first user for a second user; determining a device in a plurality of devices associated with the second user; determining a format associated with the determined device; determining if the message needs to be adapted to the determined format; if the message does need to be adapted, performing the steps of adapting the message to the determined format; and sending the adapted message to the determined device; if the message does not need to be adapted, sending the message to the determined device.

In yet another embodiment, a device configured to route messages for a plurality of users is provided. The device comprises: a receiver configured to receive a message from a first user in the plurality of users; a device determiner configured to determine a device in one or more devices associated with a second user in the plurality of users, the device determined based on one or more communication types associated with the one or more devices; and a sender configured to send the message to a device identifier associated with the determined device for the second user.

In another embodiment, a system for sending messages is provided. The system comprises: a plurality of users, each user associated with one or more devices; a message router configured to route messages from a first user to a second user, the message router comprising: a receiver configured to receive a message from the first user; a device determiner configured to determine a device in one or more devices associated with the second user, the device determined based on one or more communication types associated with the one or more devices; and a sender configured to send the message to a device identifier associated with the determined device for the second user.

A further understanding of the nature and advantages of the invention herein may be realized by reference of the remaining portions in the specifications and the attached drawings.

DETAILED DESCRIPTION OF THE INVENTION

Figure 1:
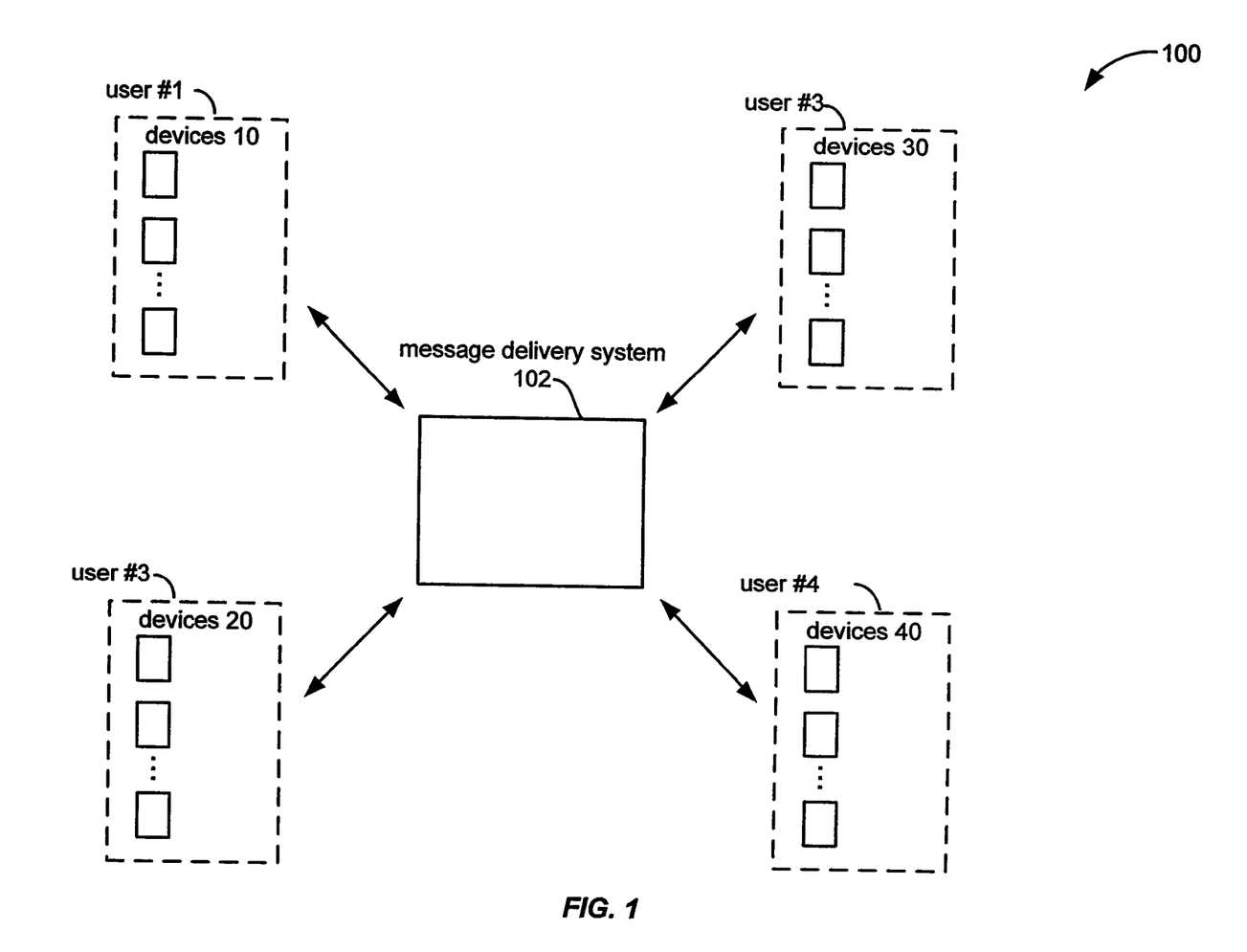
FIG. 1 depicts a system for delivering messages according to one embodiment of the present invention.

FIG. 1 depicts a system 100 for delivering messages according to one embodiment of the present invention. System 100 includes a plurality of users and a message delivery system 102.

The plurality of users can communicate with each other using message delivery system 102. As shown, the plurality of users are depicted as user #1, user #2, user #3, and user #4. Although four users are shown, it will be understood that any number of users may communicate through message delivery system 102.

Each user is associated with a number of devices. For example, users #1, #2, #3, and #4 are associated with devices 10, 20, 30, and 40, respectively. In one embodiment, a device is defined by a communication type and address. In one embodiment, a communication type includes the channel that is used to send a message. For example, a communication type may be SMS and an address may be a cellular phone number that is used to send a message through SMS. The device in this example may then be a cellular phone. In another example, a communication type may be email and an address may be an email address. The device in this example may then be a computer. It will be understood that a user may receive the email using any computer. The device determined does not need to be the device that the user will physically use and receive the message although the actual device that will be used may be determined. The device is a device type (e.g., cellular phones and computer) that the user will use to receive the message.

A user may have a separate device for each communication type but it will be understood that multiple devices may be used for multiple communication types. Also, a device may support multiple communication types. For example, a cellular phone may communicate using instant messaging, voice, SMS, and MMS. A computing device (e.g., personal computer (PC), personal digital assistant (PDA), pocket PC, etc.) may be used to communicate through email and instant messaging.

In one embodiment, each communication type for a user is associated with one or more addresses. An address is an identifier or username that uniquely identifies a user. For example, an email address is used to contact a user through email, a username for an instant message client is used to contact a user through IM, a cellular phone number is used to contact a user through voice, SMS, and MMS, a fax number is used to contact user through facsimile, etc.

Message delivery system 102 enables communication between devices of various users in system 100 and is configured to perform automatic device selection and content conversion of messages. When a message is sent to a recipient, message delivery system 102 determines devices associated with the recipient. One or more of the devices are then selected. The message may then be converted to a format associated with the selected one or more devices and the message is forwarded to the selected devices.

When, for example, user #1 desires to communicate with user #4, user #1 does not need to know how to communicate with devices 40 associated with user #4. Also, user #1 does not need to know all addresses associated with devices 40 to communicate with all of devices 40. Additionally, user #1 may use any devices 10 to communicate with any devices 40. Conventionally, a device that supports email will have to be used to communicate with another device that supports email. However, any device may be used to communicate with an email device using message delivery system 102.

In one embodiment, user #1 does not need to specify an address of a device 40. User #1 may send a message that identifies user #4 and message delivery system 102 will determine an address for a device #4. In another embodiment, user #1 may send a message to an address of a device 40 for user #4, but the message may be routed to a different address of a different device 40 for user #4.

Accordingly, user #1 does not need to know how to communicate with user #4. User #1 also does not need to specify devices in which a message should be sent because message delivery 102 will select one or more devices 40 in which to send the message and may also translate the format of the message to be compatible with the selected one or more devices 40. It will be understood, however, that user #1 may specify that a message should be sent to certain devices, such as send an email message to user #4.

Figure 2:
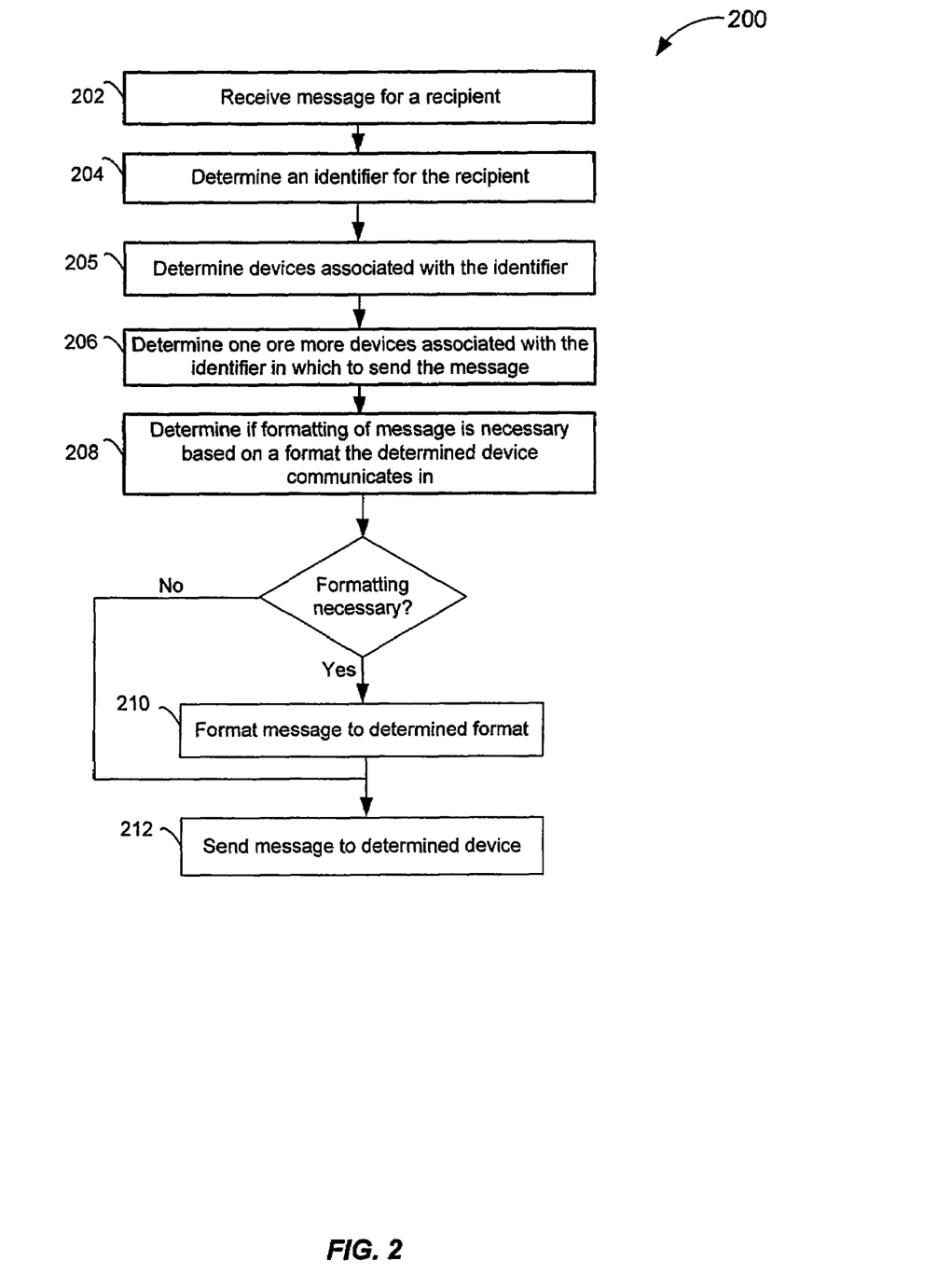
FIG. 2 illustrates a simplified flowchart of a method for sending messages according to one embodiment of the present invention.

FIG. 2 illustrates a simplified flowchart 200 of a method for sending messages according to one embodiment of the present invention. In step 202, a message for a recipient is received at message delivery system 102. In one embodiment, a message may be sent by a sender, such as user #1. A message can be sent by using any device 10 that is associated with user #1. A message may also be received for user #1 through a device other than a device 10. For example, a software program or application may specify that message delivery system 102 should send a message for user #1 to another user. An extensible markup language (XML) document may specify the content of a message for a recipient. If a device for user #1 is not used to send the message, a return message may still be sent to a device in device 10. The XML document specifies content using a markup language. The content may then be converted into another format or language that can be sent to a device.

In one embodiment, the received message may be addressed to a recipient. The address may identify a physical address of a device associated with the recipient. In another embodiment, the message may identify the recipient using an identifier (e.g., a unique username for message delivery system 102) that is not an address of a device 10. In either case, message delivery system 102 will determine the recipient for the message. Accordingly, the sender of a message does not need to specify the address of a device that will ultimately receive the message. For example, the received message may specify send an email to user #4 without specifying the email address.

In step 204, message delivery system 102 determines an identifier for the recipient. The identifier may be any username that uniquely identifies the recipient. For example, the identifier may be an address of any of the devices associated with the recipient. Also, the identifier may be a universal identifier that is not an address for a device of the recipient. The determined identifier is used to determine devices associated with the recipient. For example, if the recipient communicates using the communication types of email, IM, SMS, and MMS, the identifier is linked to device types for those communication types and any addresses that are needed to communicate with the recipient through those communication types. The identifier may also be linked to other information, such as user preferences. User preferences may be information for devices that the user prefers to communicate with and a priority scheme for sending messages to the recipient, etc.

In step 205, message delivery system 102 determines devices that are associated with the determined identifier. Any number of devices may be associated with a user depending on the number of devices a user is using to communicate. The devices may be registered with message delivery system 102 by the user or by another entity. When a device is registered, it is associated with the user's identifier.

In step 206, message delivery system 102 determines one or more devices associated with the identifier in which to send the message. Although it will be described that messages are sent to one device, it will be understood that the message may be sent to any number of devices associated with the identifier. In determining the device in which to send the message, message delivery system 102 may use information associated with the communication. For example, the information used to select the device may be the message content, device capabilities, the recipient's static preferences, the recipient's dynamic preferences, and hints from the message or application.

The message content may be used to determine the device in which to send the message. For example, if a picture is found in the message content, MMS may be the preferred way to send the message. The communication type would then be MMS and an MMS address for the recipient is determined. Further, if text is sent, then SMS or instant messaging may be preferred because they are both text-based. In this case, both communication types may be determined with the associated addresses for the communication types (e.g., a cellular phone number for SMS and a username for IM). Also, depending on other factors, such as if time is of the essence, an instant message may be sent instead of an email message. Other factors discussed below may also be used to determine the device, such as presence information. For example, a message may be sent to a device in a plurality of determined devices that shows the user's presence is active.

The device capabilities may also be used to determine the device to send the message. For example, if a device can display multimedia pictures, then that device is preferred for a message with pictures. Also, if a device can only display text, then that device is preferred for a message with text.

The user static preferences may also be used to determine the device in which to send the message. For example, a user may specify a priority scheme for determining devices. Message delivery system 102 may then determine if it is feasible to send the message to the first device in the user's preferences. If it is possible, the message is sent to the first device and if it is not possible, message delivery system 102 determines if the message can be sent to the second device in the user's preferences, and so on. Also, if multiple devices are selected, the priority scheme may indicate that a certain device should be selected. Other user preferences may indicate that if certain content is found in a message, a certain device should be used. Also, static preferences may be specified, such as send messages to a device (e.g., email) during work hours and send message to a second device (e.g., a cellular phone) during other hours.

The recipient's dynamic preferences may also be used to determine the device in which to send the message. For example, presence information may indicate a user is actively using certain devices. For example, a user may be logged onto an IM client, which indicates an active presence. Thus, IM may be the preferred way to reach the user. Accordingly, messages may be sent to the IM client at user's IM username.

Hints from the application may also be used to determine the device in which to send the message. For example, the message sent may specify that a first device should be selected first, if possible. Also, hints that override stored preferences may also be specified.

In determining a device associated with the recipient, after a communication type is determined, the address for the determined device may be determined. For example, if it is determined that an email should be sent to the recipient, an email address for the user is determined. Although the user may receive the email at any computing device that may access email, it will be understood that the device represents a device that supports receiving messages for the communication type and address.

In step 208, message delivery system 102 determines if formatting of the message is necessary based on the device determined. For example, if the message is going to be sent through SMS, the message can only have text and any graphics may be deleted. Instead of sending the graphics, a uniform resource locator (URL) may be included in a message that will provide a link to the graphic. Additionally, the message content may be shrunk to a size that will fit in a device's display. For example, a graphic may be shrunk so it can fit in a cellular phone display. Also, a message may be sent by a first device that communicates in a different format or protocol than the device that will receive the message. Thus, the message format may be incompatible because two different devices are communicating. For example, an email may be sent to message delivery system 102 and an SMS message sent to a cellular phone. Thus, the email message may be formatted in order for it to be sent to the SMS device. Accordingly, devices of different communication types may communicate using message delivery system 102.

If formatting is necessary, in step 210, message delivery system 102 formats the message to a determined format. For example, the message may be formatted to the protocol that the recipient's selected device communicates in. The formatting is done automatically without input from the user in one embodiment. Accordingly, messages that may not have been able to be sent in their original format to devices that communicate in different protocols can be sent with the format conversion.

In step 212, the message is sent to the determined device using the determined communication method. The formatted message is sent if the message is formatted or the original message is sent if formatting was not necessary. Also, the received message may indicate that only certain message content should be sent to the recipient. Thus, only the indicated message content is formatted and sent to the recipient.

Accordingly, a sender may send a message to message delivery system 102, which can then determine a device for a recipient in which to send the message. In one embodiment, a communication type and address for the recipient is determined. Also, message delivery system 102 can automatically convert the content of a message depending on the device selected. The sender may also send the message using any device and does not need to specify a destination device or the destination address for the device. Message delivery system 102 can also determine the device of the recipient that should receive the message and its address.

Figure 3:
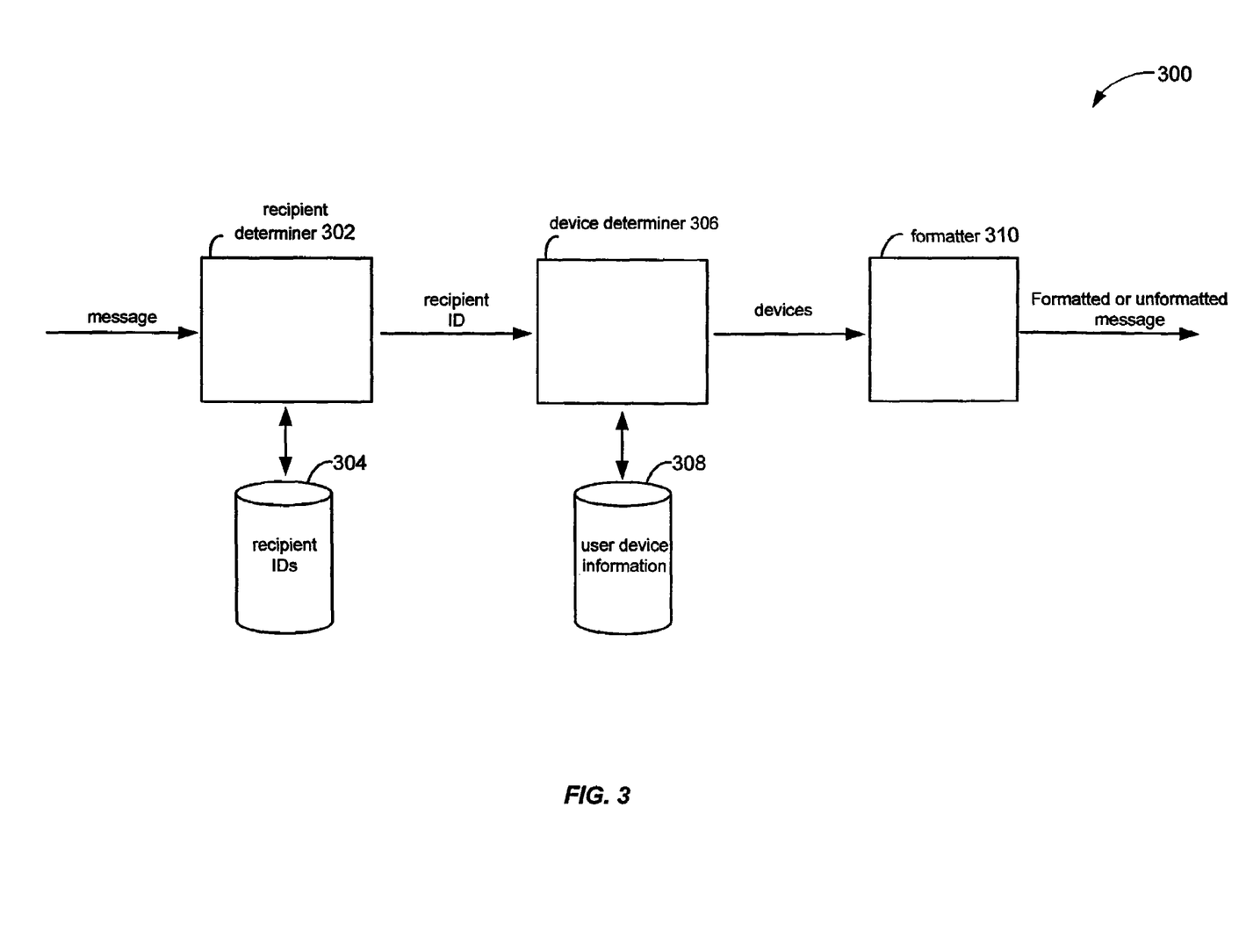
FIG. 3 illustrates a simplified block diagram of an embodiment of message delivery system according to embodiments of the present invention.

FIG. 3 illustrates a simplified block diagram 300 of an embodiment of message delivery system 102 according to embodiments of the present invention. Message delivery system 102 includes a recipient identifier 302, a device determiner 306, and a formatter 310.

Recipient identifier 302 receives a message and outputs a recipient identifier. Recipient determiner 302 may communicate with a database 304 to determine the recipient identifier. Database 304 may include information for a plurality of recipients. For example, each recipient may be associated with a universal identifier. The universal identifier is also associated with the physical addresses of the communication types for each user. Alternatively, the addresses for communication types may be associated with all each other instead of using a universal identifier. When one of the addresses is encountered, other addresses for the user may be determined. Accordingly, recipient determiner 302 performs the functions described in steps 202 and 204 of FIG. 2.

Device determiner 306 receives the determined recipient identifier from recipient determiner 302 and determines one or more devices in which to send the message. In determining the device, device determiner 306 may communicate with a database 308 that includes user device information. User device information may include information for communication types the recipient uses to communicate. Also, device determiner 306 determines, for each determined communication type, the address in which to send the message. Accordingly, device determiner 306 performs the functions described in step 206 of FIG. 2.

Formatter 310 receives the determined device and message from device determiner 306 and outputs a formatted message. In other embodiments, formatter 310 may not need to format the message. For example, the recipient's device may communicate in a different protocol than the device that sent the message. Also, the message may be formatted to the display capabilities of the recipient's device. The message, formatted if necessary, is then sent to the selected device using the determined communication type. Accordingly, formatter 310 performs the functions described in steps 210 and 212 of FIG. 2.

Figure 4:
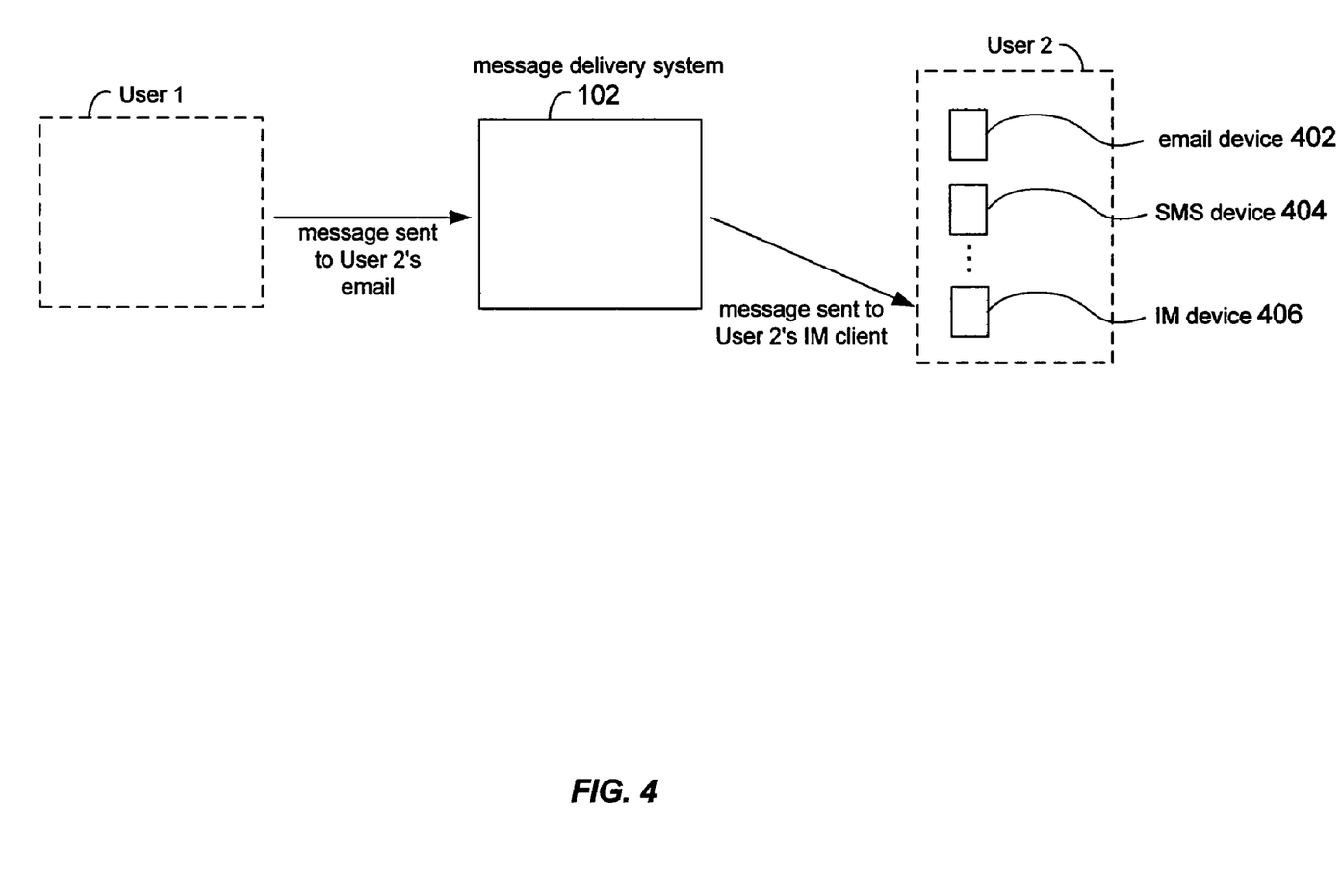
FIG. 4 illustrates an example of a first user sending a message to a second user through a message delivery system according to one embodiment of the present invention.

FIG. 4 illustrates an example of a user #1 sending a message to a user #2 through a message delivery system 102 according to one embodiment of the present invention. User #1 may use any communication methods to send a message to user #2. For example, user #1 may send an email message to an email address for a user #2. User #1, however, does not need to send a message to user #2's email, but may use any other identifier for user #2, such as a unique identifier for user #2 that is recognized by a message delivery system 102, a phone number, the username for instant messaging, etc. Also, user #1 may use any device or communication method to send a message to user #2. For example, if user #1 desires to send an email to user #2, the message does not have to be sent in an email to user #2's email address. An SMS message specifying that an email be sent to user #2 may be used in one example.

Message delivery system 102 receives the email message for user #2, determines an identifier for user #2 and any devices that are associated with user #2. For example, message delivery system 102 may determine that user #2 can communicate through email, SMS, and instant messaging. As shown, user #2 is associated with an email device 402, an SMS device 404, and an IM device 406. The three devices are associated with the identifier for user #2.

Message delivery system 102 then determines a communication type that will be used to send the message received from user #1. The communication type may be determined based on a number of factors described above. In one embodiment, message delivery system 102 determines that the email message should be sent to the IM device 406 associated with user #2. This determination may be made because a user is presently logged onto IM device 406 or user preferences indicate that the user prefers to receive IM messages. Message delivery system 102 may also format the email message into a format compatible with IM device 406. The message is then sent to the IM client 406 associated with user #2.

Accordingly, an email message sent by user #1 to message delivery system 102 was converted into an instant message that was sent to IM device 406 for user #2. User #1 did not need to know how to reach any devices associated with user #2 in order to send the message to IM device 406. Message delivery system 102 receives the email addressed to user #2 and determines how to reach user #2.

While the present invention has been described using a particular combination of hardware and software implemented in the form of control logic, it should be recognized that other combinations of hardware and software are also within the scope of the present invention. The present invention may be implemented only in hardware, or only in software, or using combinations thereof.

The above description is illustrative but not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

What is claimed is:

1. A method for sending a communication, the method comprising:
    under control of one or more message delivery computer systems including executable instructions,
    receiving a communication from a sender to be delivered to a recipient;
    determining a recipient identifier associated with the communication;
    determining a plurality of devices associated with the recipient using the recipient identifier, the plurality of devices being of at least two device types;
    determining presence information for the recipient;
    determining a user preference for delivery of the communication to the recipient, the user preference indicating a priority scheme for determining at least one of a selected device and a selected device type to which to deliver the communication;
    delivering the communication to a second device of the plurality of devices that is a highest priority device indicated in the priority scheme of the user preference that is indicated to be active by the presence information, the communication being delivered in a second protocol used for communication by the second device;
    determining a format associated with the second device;
    determining whether the communication needs to be adapted to the determined format; and
    if the communication needs to be adapted, adapting the communication to the determined format before delivering the communication to the second device.

2. The method of claim 1, wherein determining the user preference for delivery includes determining a content of the communication.

3. The method of claim 1, wherein the user preference is changeable by the user in order to update preference information.

4. The method of claim 1, wherein the user preference further indicates multiple devices to receive the communication based on a time of delivery of the communication.

5. The method of claim 1, wherein the determined format comprises at least one of a short message system (SMS), email, instant message (IM), and voice message format.

6. The method of claim 1, wherein adapting the communication comprises adapting content of the received communication to content compatible with the determined format.

7. The method of claim 1, wherein determining the user preference includes using communication capabilities for the plurality of device types.

8. A method for establishing a connection for communication, the method comprising:
    under control of one or more message delivery computer systems including executable instructions,
    receiving a communication request from a sender for a recipient;
    determining presence information for the recipient;
    determining a user preference for communication with the recipient, the user preference indicating a priority scheme for determining at least one of a selected device and a selected device type with which to establish the connection for communication, the user being associated with at least two devices each having a device type and being operable to provide the connection for communication;
    establishing the connection with a second device of the at least two devices that is a highest priority device indicated in the priority scheme of the user preference that is indicated to be active by the presence information, the connection being established in a second protocol used for communication by the second device;

determining a format associated with the second device;

determining whether a communication to be sent using the established connection communication needs to be adapted to the determined format; and if the communication needs to be adapted, adapting the communication to the determined format before delivering the communication to the second device using the established connection.

* * * * *

UNITED STATES PATENT AND TRADEMARK OFFICE
CERTIFICATE OF CORRECTION

| | | |
|---|---|---|
| PATENT NO. | : 7,620,408 B2 | Page 1 of 1 |
| APPLICATION NO. | : 11/615770 | |
| DATED | : November 17, 2009 | |
| INVENTOR(S) | : Zhou Ye et al. | |

It is certified that error appears in the above-identified patent and that said Letters Patent is hereby corrected as shown below:

Title Page, Item [*] Notice:

The phrase "by 106 days" shall reflect as such appears on Letters Patent.

On sheet 2 of 4, in Figure 2, Box 206, line 1, delete "ore" and insert -- or --, therefor.

In column 7, line 46, delete "#l" and insert -- #1 --, therefor.

In column 8, line 41, in claim 5, delete "system" and insert -- service --, therefor.

Signed and Sealed this

Second Day of November, 2010

David J. Kappos
*Director of the United States Patent and Trademark Office*